Aug. 22, 1961 F. H. DAVIS 2,996,945

SCANNER DISC

Filed Sept. 12. 1955 3 Sheets-Sheet 1

INVENTOR

FRED H. DAVIS

BY

G. O'Brien

V. C. Muller

ATTORNEY

Aug. 22, 1961 F. H. DAVIS 2,996,945

SCANNER DISC

Filed Sept. 12. 1955 3 Sheets-Sheet 2

INVENTOR
FRED H. DAVIS

BY G. W. O'Brien
V. C. Muller
ATTORNEY

Aug. 22, 1961 F. H. DAVIS 2,996,945

SCANNER DISC

Filed Sept. 12. 1955 3 Sheets-Sheet 3

INVENTOR.
FRED H. DAVIS

BY G. D. O'Brien
V. C. Muller
ATTORNEYS

United States Patent Office 2,996,945
Patented Aug. 22, 1961

2,996,945

SCANNER DISC

Fred H. Davis, Los Angeles, Calif., assignor to the United States of America as represented by the Secretary of the Navy Filed Sept. 12, 1955, Ser. No. 533,922
24 Claims. (Cl. 88—1)
(Granted under Title 35, U.S. Code (1952), sec. 266)

The invention described herein may be manufactured and used by or for the Government of the United States of America for governmental purposes without the payment of any royalties thereon or therefor.

This invention relates to scanning devices, and particularly to scanning discs for reducing spurious signals in a passive optical tracking system due to clouds and the horizon.

This invention also is related to improvements in scanner discs of the type such as are disclosed in U.S. patent application Serial No. 385,901, filed October 13, 1953, by Lucien M. Biberman et al., and entitled Multislit Scanner.

The quality of the output signal of a target signal generator determines, to a large extent, the effectiveness of the overall guidance system of which the target signal generator is but a component. Studies of the output signals of target signal generators show that the output signals have three components, one component, the target signal, which is due to the contrast between the radiation from a target as compared with the radiation from the background of the target, for example, from the sky; a second component, the background signal, which is due to variations in the intensity of radiations from the background; and a third component which is due to circuit noise. The target signal is, of course, the useful component, and it has been found that properly designed scanners can greatly reduce the background signal resulting from variations in the sky radiation.

A substantially straight line reticle has a tendency to generate a larger signal when cutting a line than when cutting a point. Therefore, it tends to produce a stronger signal on a linear or extended type target such as presented by a horizon. The particular scanner discs of this invention are designed so that a certain amount of opaque area and transparent area cutting a linear target will give a net result of zero change in light flux. Therefore, no signal should be generated on a linear or extended target. In practice, scanner discs of this invention achieve a signal which is relatively small for extended or linear targets, such as clouds and horizons, while producing a useful signal from point targets, such as aircraft.

An object of the invention, therefore, is to provide a scanner disc which will reduce spurious signals in a passive optical tracking system due to extended or linear type targets such as clouds and horizon.

Another object of this invention is to provide an improved scanner disc for a target signal generator which substantially eliminates the background signal from the output voltage of a target signal generator.

A further object of the invention is to provide a scanner disc for a target signal generator which emphasizes the target signal and substantially suppresses the background signal in the output voltage of the generator.

Other objects and many of the attendant advantages of this invention will be readily appreciated as the same become better understood by reference to the following detailed description when considered in connection with the accompanying drawings wherein.

Figure 1:
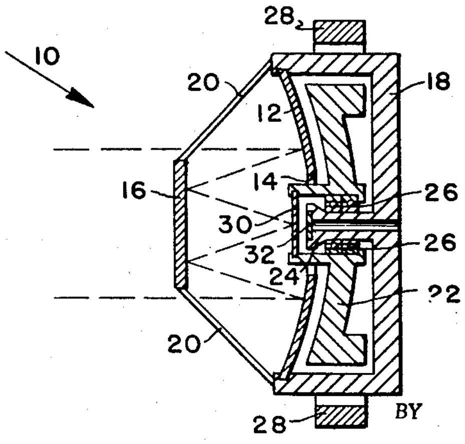
FIG. 1 is a schematic diagram of one form of a target signal generator.

In FIG. 1 of the drawings, one form of a target signal generator 10 is illustrated. The generator consists of a Cassegrain telescope having a spherical reflector 12 provided with an opening 14 in its center, and a plane reflector 16 which is mounted on an inner gimbal 18 by narrow supports 20. The spherical reflector 12 is likewise secured to the inner gimbal 18. Rotor 22 is supported for rotation about an axle 24 by anti-friction bearings 26. The axle 24 is mounted on inner gimbal 18 which in turn is mounted in a conventional manner (not illustrated) within outer gimbal 28. The rotor 22, inner gimbal 18 and outer gimbal 28 constitute components of a two degrees of freedom gyroscope. A scanner 30 is mounted on rotor 22 at the focal plane of the telescope, and a photo-sensitive detector 32 is mounted on axle 24. The Cassegrain telescope comprising spherical reflector 12 and plane reflector 16, scanner 30, and photo-sensitive detector 32 constitute the target signal generator 10.

Figure 2:
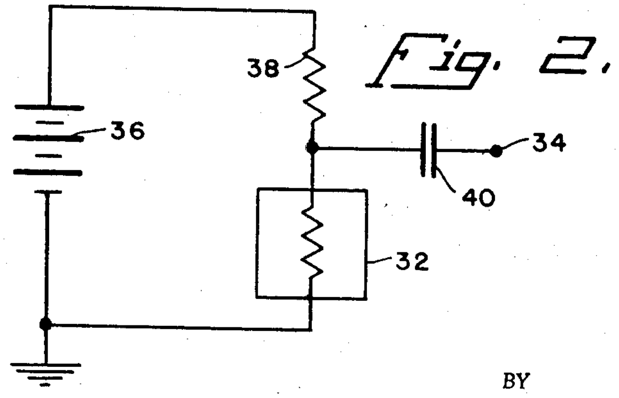
FIG. 2 is a wiring diagram of a target signal generator.

Photo-sensitive detector 32, for example, is formed of lead sulfide, the resistance of which varies inversely with the intensity of the incident radiation. The circuit of FIG. 2 illustrates one manner in which the variation in resistance of detector 32 can be connected into an A.C. output voltage between terminal 34 and ground by a source 36 of substantially D.C. potential, a fixed dropping resistor 38, and condenser 40.

The Cassegrain telescope focuses radiation from sources within the view of the telescope onto scanner disc 30. Scanner disc 30 rotates with rotor 22 at the spin frequency, $f_r$ of rotor 22. The incident radient energy falling on detector 32 is chopped by the scanner disc 30 and variations in the intensity of the incident radiation falling on detector 32 generates the A.C. output voltage of the target signal generator 10.

A systematic series of investigations was carried out to determine the character of the radiant energy from various types of sky backgrounds. From these investigations it has been learned that the sky varies in radiometric brightness over the field of view of the telescope and produces a background signal that is rich in harmonics of the frequency of rotation, $f_r$ of the scanner disc, or its scan frequency, which signal is due to non-linear gradients of the radiometric brightness of the sky background. As the area of the sky scanned is reduced, or the abruptness of the discontinuity in the brightness increases, e.g., a small bright cloud is in the field of view, the harmonics of the sky signal increase in number and in amplitude. However, in nature, such discontinuities are rarely very sharp, so that substantially no component of the output voltage of target generator 10 due to the non-linear sky gradients is found above the eighth harmonic of the spin frequency, $f_r$. Investigations of the character of radiant energy from targets such as aircraft show that the target signal is rich in harmonics to and above the twentieth harmonic of the scan frequency, $f_r$.

Figure 3:
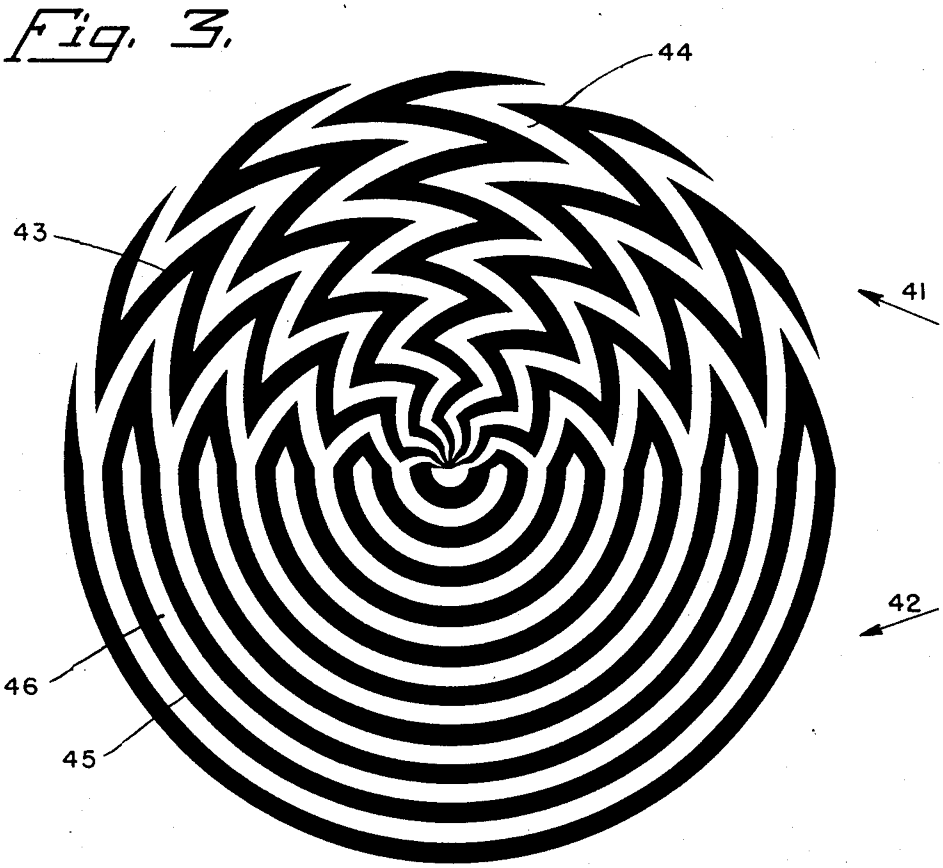
FIG. 3 is a plan view of one form of an improved scanner disc.
Figure 4:
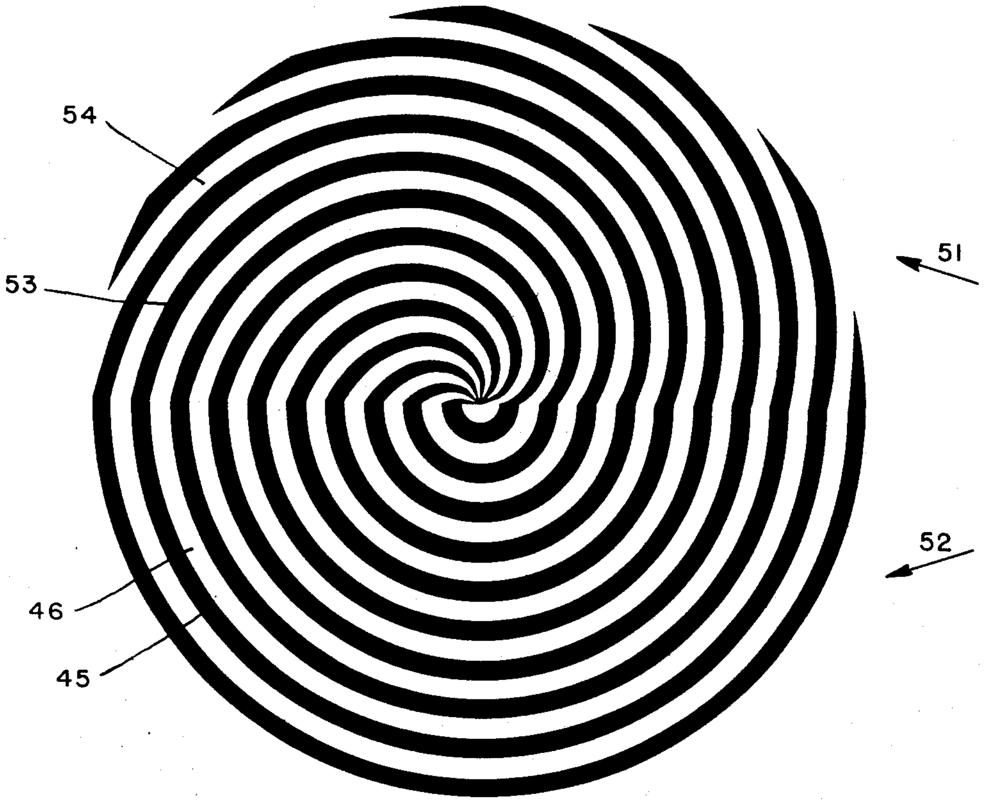
FIG. 4 is a plan view of a second form of an improved scanner disc.

The scanner discs, FIGS. 3 and 4, of the present invention are so designed as to reduce spurious signals due to extended or linear targets such as clouds and the horizon in a passive optical tracking system. Further, they are designed so the frequency of the target signal, $f_s$, is greater than the eighth harmonic of the frequency of rotation, $f_r$, of scanner 30 with the result that substantially none of the background signal is present. This has never been successfully accomplished before. Scanner discs FIGS. 3 and 4 each consist of two semicircular sectors 41, 42, 51 and 52. Sectors 41 and 51 of the scanner discs are for target sensing. Semicircular sector 41 of FIG. 3 comprises a plurality of zig-zag radially extending opaque lines 43 of increasing saw-tooth configuration; the zig-zag increasing saw-tooth configuration is formed by portions of intersecting oppositely directed spiral curve lines spiralling outwardly from the center of the scanner disc. The plurality of transparent spaces or slits 44 between the plurality of opaque saw-tooth lines 43 are of the same width and configuration as the lines 43. The transparent spaces 44 each have a radial component since they extend from the center to the circumference of the scanner disc. Semicircular sector 51, of FIG. 4, is comprised of opaque spiral lines spiralling outwardly from the center of the scanner disc. The spaces or slits 54 between the spiral lines 53 are transparent and of the same width and configuration as the lines 53. Half-circle sectors 42 and 52 of the scanner discs are for indicating the phase of the signal generated by the target sensing sectors 41 and 51 and are comprised of a series of alternate, concentric, semicircular, opaque lines 45 and transparent spaces 46 of increasing radius; the lines and spaces are of equal width. Sectors 42 and 52 are semi-transparent so as to permit one-half of the radiant energy falling on the phasing sector to be transmitted, or the phasing sectors, to describe them in another way, have an optical density of one-half. The optical density of the target sensing sectors 41 and 51 is also one-half. In FIGS. 3 and 4, the desired optical density is achieved by making the lines 45 and 53 opaque and the spaces 44 and 46 transparent. Scanner discs, FIGS. 3 and 4, can be made by a photo-engraving process in which, by the use of bichromated gelatin, the desired patterns can be etched in a surface of silver on glass. The desired patterns can be prepared by photographic reduction of hand drawn masters.

The spirals of sectors 41 and 51 follow the spiral equation $R=K(\theta+C)$ where R is the radius, $\theta$ is the angular measurement, and K and C are constants. For each family of curves for a spiral, the constants K and C will be different.

Figure 5:
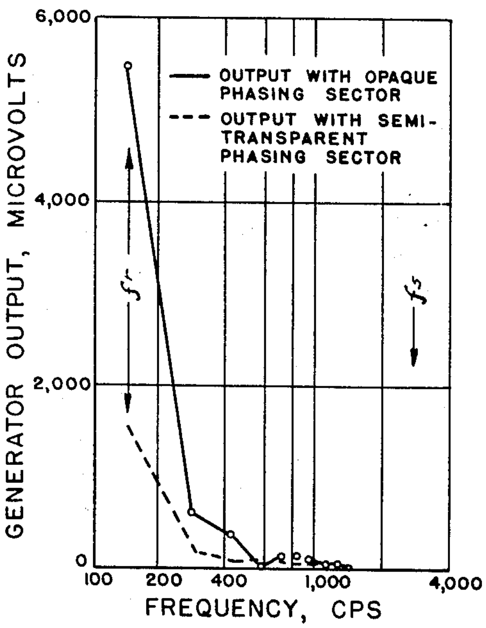
FIG. 5 shows curves of the output voltage of the target signal generator plotted against frequency obtained from a sky background.
Figure 6:
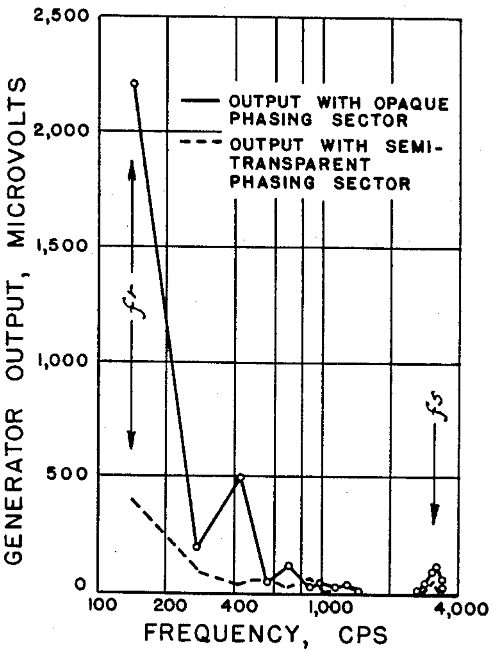
FIG. 6 shows curves of the output voltage of the target signal generator plotted against frequency obtained from a target against a daytime sky.

From FIG. 5 it can be seen that there are substantially no harmonics of the background signal which are greater than eight times the spin frequency of the scanner, and from FIG. 6 it can be seen that at the target signal, or its slit frequency, $f_s$, there is a signal of appreciable magnitude generated when a target is within the field of view of the telescope. Slit frequency, $f_s$, is determined by the number, $n$, of the slits or spaces 44 or 54 in the target sensing portion of a scanner disc, the frequency of rotation, $f_r$, of the scanner disc, and a constant K, whose value is equal to the ratio of the angular extent of a circle divided by the angular extent of a target sensing section 41 or 51, or (1) $$f_s=Knf_r$$

and (2) $$\frac{f_s}{f_r}=Kn$$

In order for the target signal, having a frequency equal to the slit frequency, $f_s$, not to contain portions of the background signal, $f_s$ should be at least eight or more times greater than $f_r$, so that K$n$ is equal to or greater than 8. In scanner discs, FIGS. 3 and 4, $n$ is 6 and K is 2 so that $f_s$ is the 12th harmonic of $f_r$. There is, however, an upper limit to the value of K$n$ which is determined by the frequency limitations, or time constants, of detector 32, and by the decrease in amplitude of the target signal as slit frequency, $f_s$, increases. Detector response time is limited by the time for the detector 32 to change its resistance responsive to changes in the incident radiant energy. The signal rise and decay periods are in the order of 100 microseconds. Thus, the slit frequency must be a high enough harmonic of the spin frequency of the scanner disc so that substantially no background signal is present and yet low enough not to exceed the time constant of the detector. Since the magnitude of $f_r$, is determined by the angular velocity of rotor 22, and the angular velocity of rotor 22 is determined by the characteristics desired of the gyroscope, the possible number, $n$, of slits 44 or 54 is limited, and a suitable compromise must be made which considers all the possible variants.

A comparison of FIGS. 5 and 6 shows that the maximum amplitude of the background signal when using an opaque phasing sector is much greater than the maximum amplitude of the background signal when a semi-transparent phasing sector, such as sections 42 and 52, having the same optical density as the target sensing sectors 41 and 51, is used. FIG. 6 shows that the amplitude of the target signal at slit frequency is of the same order of magnitude as the maximum amplitude of background signal which occurs at the spin freququency, $f_r$. This favorable comparison of the amplitudes makes it relatively simple to build a narrow band pass amplifier which amplifies the target signal at the slit frequency and substantially suppresses the background signal.

Figure 7:
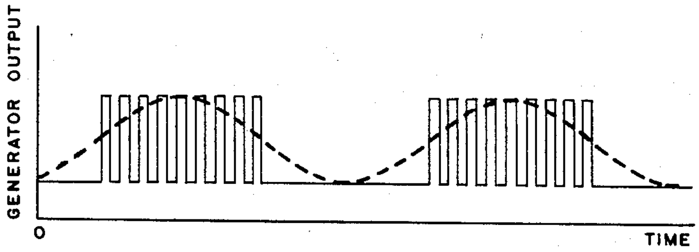
FIG. 7 is a curve of the output voltage of a target signal generator having an opaque phasing sector plotted against time.
Figure 8:
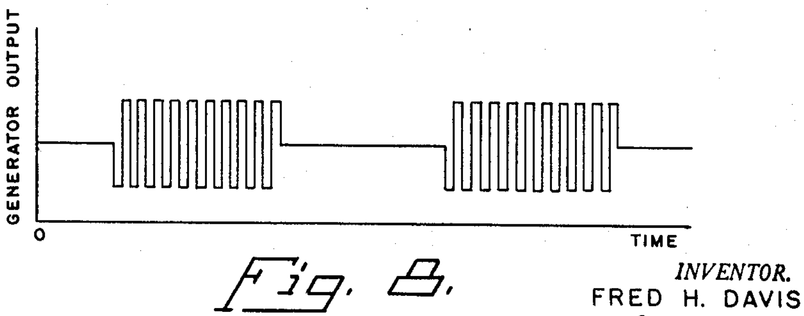
FIG. 8 is a curve of the output voltage of a target signal generator having semi-transparent phasing sector plotted against time.

FIGS. 7 and 8 explain the benefits of the semi-transparent phasing sector. The output voltage does not have a central symmetry when an opaque phasing sector is used; i.e., the optical densities of the phasing and target sensing sectors are unequal, and therefore, has a strong fundamental frequency corresponding to the average value of the dashed line illustrated in FIG. 7. When a semi-transparent phasing sector is used, i.e., the optical densities of the phasing and target sectors are substantially equal, the output voltage of the generator 10 has central symmetry so that the amplitude of the background signal at the spin frequency, $f_r$, is greatly reduced as seen in FIGS. 5 and 6.

Obviously, many modifications and variations of the present invention are possible in the light of the above teaching. It is, therefore, to be understood that within the scope of the appended claims the invention may be practiced otherwise than as specifically described.

What is claimed is:

1. A scanner disc consisting of a target sensing section and a phase sensing section, said target sensing section comprising a plurality of zig-zag, radially extending, opaque lines of increasing saw-tooth configuration and a plurality of transparent spaces between said zig-zag lines having the same width and configuration as said lines, said phase sensing section comprising a plurality of alternately opaque and transparent concentric lines and spaces of equal width.

2. A device as in claim 1 wherein said target sensing section and said phase sensing section are each semicircular in shape.

3. A device as in claim 2 wherein the increasing saw-tooth configuration of said zig-zag radially extending lines and spaces of said target sensing section is formed by portions of a two series of intersecting, oppositely directed spiral lines spiralling outwardly from the center of said scanner disc.

4. A device as in claim 2 wherein the optical densities of said target sensing section and said phase sensing section is substantially one-half.

5. A device as in claim 2 wherein the optical density of the target sensing section is substantially equal to the optical density of the phase sensing section.

6. A scanner disc consisting of a target sensing section and a phase sensing section of substantially equal size, said target sensing section comprising a plurality of zig-zag radially extending alternately opaque lines and transparent slits of increasing saw-tooth configuration, and said phase sensing section comprising a plurality of alternately opaque and transparent concentric lines and spaces.

7. A device as in claim 6 wherein the opaque lines and transparent spaces and slits are of equal width.

8. A device as in claim 6 wherein said target sensing sector and said phase sensing sector are each semi-circular in shape.

9. A device as in claim 6 wherein the increasing saw-tooth configuration of said zig-zag radially extending lines and slits of said target sensing section is formed by portions of a series of intersecting, oppositely spiral lines spiralling outwardly from the center of said scanner disc.

10. A scanner disc consisting of a target sensing sector and a phase sensing sector, said sectors being of substantially equal size, said target sensing sector comprising a plurality of zig-zag radially extending alternately opaque lines and transparent spaces of increasing saw-tooth design, and said phase sensing sector comprising a plurality of concentric alternately opaque lines and transparent spaces, the increasing saw-tooth design of said zig-zag radially extending lines and spaces of said target sensing sector being formed by portions of a series of intersecting, oppositely directed, spiral lines spiralling outwardly from the center of said scanner disc.

11. A device as in claim 10 wherein said opaque lines and transparent spaces are of equal width.

12. A device as in claim 11 wherein the shape of said target sensing sector and said phase sensing sector is a semicircle.

13. A scanner disc consisting of a phase sensing sector and a target sensing sector of substantially equal size, each said sector comprising a semicircle, said phase sensing sector comprising a series of alternately opaque and transparent concentric semicircular lines of equal width, said target sensing sector comprising a series of alternately opaque lines and transparent spaces of equal width and substantially the same shape, each of said lines and spaces of said target sensing sector extending outwardly in radial symmetry from the center of said disc in a continuously varying devious manner.

14. A device as in claim 13 wherein the optical densities of said target sensing sector and said phase sensing sector is substantially one-half.

15. A device as in claim 14 wherein the optical density of the target sensing sector is substantially equal to the optical density of the phase sensing sector.

16. A scanner disc consisting of a target sensing section and a phase sensing section of substantially equal size, said target sensing section comprising a series of alternate spiral shaped lines and spaces, said lines being opaque and said spaces being transparent, said phase sensing section comprising a series of alternately opaque and transparent concentric lines and spaces.

17. A device as in claim 16 wherein said lines and spaces are of equal width.

18. A device as in claim 17 wherein said target sensing section and said phase sensing section are each semicircular in shape.

19. A device as in claim 18 wherein the optical densities of said target sensing section and said phase sensing section is substantially one-half.

20. A device as in claim 18 wherein the optical density of the target sensing section is substantially equal to the optical density of the phase sensing section.

21. A scanner disc consisting of a target sensing section and a phase sensing section, said target sensing section comprising a plurality of alternate spiral lines and spaces of equal width, spiralling outwardly from the center of said disc, said lines being opaque and said spaces being transparent, said phase sensing section comprising a plurality of alternately opaque and transparent semicircular lines and spaces of equal width.

22. A device as in claim 21 wherein said target sensing section and said phase sensing section are each semicircular in shape.

23. A scanner disc consisting of a semicircular target sensing sector and a semicircular phase sensing sector, said target sensing sector comprising a plurality of alternate spiral lines and spaces, and said phase sensing section comprising a plurality of alternate semicircular lines and spaces.

24. A scanner disc consisting of a semicircular target sensing section and a semicircular phase sensing section, said target sensing section comprising a plurality of alternate spiral-shaped lines and spaces of equal width spiralling outwardly from the center of said disc, said spiral lines being opaque and said spiral spaces being transparent, said phase sensing section comprising a plurality of alternately opaque and transparent concentric semicircular lines and spaces of equal width.

References Cited in the file of this patent

UNITED STATES PATENTS

| | | |
|---|---|---|
| 2,431,510 | Salinger | Nov. 25, 1947 |
| 2,502,319 | Golay | Mar. 28, 1950 |